(12) United States Patent
Taha et al.

(10) Patent No.: US 10,337,186 B2
(45) Date of Patent: Jul. 2, 2019

(54) DUCTILE FIBER REINFORCED POLYMER PLATES AND BARS USING MONO-TYPE FIBERS

(71) Applicant: STC.UNM, Albuquerque, NM (US)

(72) Inventors: Mahmoud Reda Taha, Albuquerque, NM (US); Eslam Mohamed Soliman, Albuquerque, NM (US)

(73) Assignee: STC.UNM, Albuquerque, NM (US)

( * ) Notice: Subject to any disclaimer, the term of this patent is extended or adjusted under 35 U.S.C. 154(b) by 0 days.

(21) Appl. No.: 15/528,459

(22) PCT Filed: Nov. 20, 2015

(86) PCT No.: PCT/US2015/061891
§ 371 (c)(1),
(2) Date: May 19, 2017

(87) PCT Pub. No.: WO2016/081849
PCT Pub. Date: May 26, 2016

(65) Prior Publication Data
US 2017/0314269 A1 Nov. 2, 2017

Related U.S. Application Data

(60) Provisional application No. 62/082,477, filed on Nov. 20, 2014.

(51) Int. Cl.
*E04C 5/07* (2006.01)
*B32B 5/12* (2006.01)
(Continued)

(52) U.S. Cl.
CPC ............ *E04C 5/073* (2013.01); *B32B 5/12* (2013.01); *E04C 5/07* (2013.01); *B32B 5/00* (2013.01);
(Continued)

(58) Field of Classification Search
CPC ... E04C 5/073; E04C 5/07; B32B 5/12; B32B 2250/20; B32B 5/22; B32B 2260/023; B32B 5/26; B32B 5/00; Y10T 428/2495
See application file for complete search history.

(56) References Cited

U.S. PATENT DOCUMENTS 5,613,334 A * 3/1997 Petrina ............... E04C 5/07
  52/223.1
8,426,501 B1 * 4/2013 Taha ................ C04B 28/02
  106/638

(Continued)

OTHER PUBLICATIONS

United States International Searching Authority; International Search Report & Written Opinion for PCT/US2015/061891; dated Feb. 2, 2016; 7 pages; Alexandria, VA; US.

*Primary Examiner* — David Sample
*Assistant Examiner* — Donald M Flores, Jr.
(74) *Attorney, Agent, or Firm* — Vogt IP; Keith A. Vogt (57) ABSTRACT

The present invention provides a fiber reinforced polymer composite having a plurality of layers containing a plurality of fibers. The layers may be configured to maintain predetermined load sharing ratios among the layers at different load levels to produce a gradual load transfer between the different layers during the progressive failure of the composite. The composite is comprised of mono-fibers and the load sharing ratios of the layers have coefficients of variation that are less than 20%.

14 Claims, 12 Drawing Sheets

(51) Int. Cl.
 *B32B 5/00* (2006.01)
 *B32B 5/26* (2006.01)
 *B32B 5/22* (2006.01)

(52) U.S. Cl.
 CPC . *B32B 5/22* (2013.01); *B32B 5/26* (2013.01); *B32B 2250/20* (2013.01); *B32B 2260/023* (2013.01); *Y10T 428/2495* (2015.01)

(56) References Cited

U.S. PATENT DOCUMENTS

| | | | |
|---|---|---|---|
| 8,511,038 B2 * | 8/2013 | Brandstrom | E04C 5/07 52/125.1 |
| 2013/0239503 A1 * | 9/2013 | Miller | C04B 20/0068 52/414 |

* cited by examiner

Layer 1: 0.14 mm ($\theta$ = 0 degree)
Layer 2: 2 x 0.14 mm ($\theta$ = 3 degree)
Layer 3: 4 x 0.14 mm ($\theta$ = 6 degree)
Layer 4: 6 x 0.14 mm ($\theta$ = 12 degree)
Layer 5: 8 x 0.14 mm ($\theta$ = 18 degree)
Layer 6: 10 x 0.14 mm ($\theta$ = 30 degree)

Layer 1: 0.14 mm (θ = 0 degree)
Layer 2: 2 x 0.14 mm (θ = 16 degree)
Layer 3: 4 x 0.14 mm (θ = 12 degree)
Layer 4: 6 x 0.14 mm (θ = 18 degree)
Layer 5: 8 x 0.14 mm (θ = 30 degree)
Layer 6: 10 x 0.14 mm (θ = 45 degree)

Layer 1: 0.14 mm (θ = 0 degree)
Layer 2: 1 x 0.14 mm (θ = 3 degree)
Layer 3: 2 x 0.14 mm (θ = 6 degree)
Layer 4: 3 x 0.14 mm (θ = 12 degree)
Layer 5: 4 x 0.14 mm (θ = 18 degree)
Layer 6: 5 x 0.14 mm (θ = 30 degree)

DUCTILE FIBER REINFORCED POLYMER PLATES AND BARS USING MONO-TYPE FIBERS

RELATED APPLICATIONS

This application claims the benefit of U.S. Provisional Application No. 62/082,477 filed Nov. 20, 2014 and herein incorporated by reference.

STATEMENT REGARDING FEDERALLY SPONSORED RESEARCH & DEVELOPMENT

Not applicable.

INCORPORATION BY REFERENCE OF MATERIAL SUBMITTED ON A COMPACT DISC

Not applicable.

BACKGROUND OF THE INVENTION

There has been considerable interest in designing new concrete structures and strengthening existing concrete structures using fiber reinforced polymers (FRP). Two basic types of FRP exist: carbon (CFRP) and glass (GFRP). FRP materials exist in two forms (unidirectional or bi-directional).

FRP materials provide linear elastic responses under tension loads. In infrastructure applications, nonlinear behavior is important as it allows ductile (non-sudden) failure of structures which is required by most design codes worldwide. The absence of ductility (sudden and brittle failure) at low strains has hindered the widespread use of FRP in civil infrastructure.

Hybrid FRP systems have been developed and have shown the ability to provide nonlinear behavior. However, these systems require a combination of multiple types of fibers (not mono-type) which make hybrids expensive, cumbersome and unattractive for field applications. Failure strain of hybrid fibers has been limited to 3% which does not truly represent ductile behavior.

Moreover, reinforced and pre-stressed concrete infrastructures built in the 1960's and 1970's and are now observing severe deterioration due to corrosion of conventional steel reinforcement. Corrosion of steel typically results from the exposure to aggressive environments (e.g. freeze and thaw cycles) and the use of de-icing salt. Several techniques such as epoxy coated steel bars have been developed to combat corrosion. While these techniques have been able to reduce the rate of corrosion, they have not been able to eliminate the corrosion problem entirely.

There has been considerable interest in designing new concrete structures and strengthening existing concrete structures using FRP. FRP composites offer high strength and low weight, non-corrosiveness, and flexibility in design. Therefore, they represent ideal alternatives to conventional steel reinforcement. Two basic types of FRP exist in structural concrete applications: carbon (CFRP) and glass (GFRP). FRP composites can also be manufactured in different forms such as unidirectional or bi-directional materials. However, the absence of ductility associated with the use of FRP composites has hindered the widespread adoption of FRP composites in civil infrastructure. The absence of ductility is attributed to the linear elastic response of the FRP composite under tension loads. In infrastructure applications, nonlinear behavior of structural components is very important to avoid brittle (catastrophic) failure of structures which is required by most design codes worldwide.

BRIEF SUMMARY OF THE INVENTION

In one embodiment, the present invention provides an apparatus and method to produce nonlinear ductile behavior of FRP composites such as plates and bars.

In other embodiments, the present invention provides optimal solutions that are based on the type of fibers and matrix used. In some embodiments, the strength of the composites, such as plates or bars, is relatively high ($\geq 170$ MPa) and the failure strain is considerably high ($\geq 5.0\%$) such that the embodiments of the present invention can be used for many infrastructure and aerospace applications.

In yet other embodiments, the preset invention provides composites which have significantly higher strength and failure strains which may be achieved by the use of a matrix that is reinforced with nanomaterials.

In other embodiments of the present invention, the non-linearity/ductility of a FRP composite is based on shared stiffness, which can be controlled by optimizing two variables: fiber angle of orientation and the fiber lamina thickness. In other aspects, the present invention provides a computational method, experimentally validated, to identify the optimal fiber orientation and lamina thickness.

In other embodiments, the present invention provides ductile FRP plates and circular bars using mono-type fibers. Other embodiments of the present invention include ductile CFRP plates, ductile CFRP circular bars and ductile GFRP circular bars.

In yet other embodiments, the present invention provides ultra ductile FRP plates and bars using mono-type fibers and nanomaterials.

In other embodiments, the present invention includes ductile CFRP plates having nonlinear load-displacement and high-failure strain using angles of 0, 3, 6, 12, 18 and 30 degrees and with lamina thickness ratio of 1:1.5:2:3:4:8 and overall plate thickness of less than 3.3 mm.

Other embodiments of the present invention provide a method of making FRP composites, the proposed method is independent of mono-fiber type (glass, carbon, aramid, Kevlar, synthetic or any other fiber type) and matrix (epoxy, polyester, vinyl ester) or any other polymer or nanocomposite.

In still further embodiments, the present invention provides ductile FRP plates and circular bars using mono-type fibers as well as ultra-ductile FRP plates and bars using mono-type fibers and nanomaterials.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings illustrate generally, by way of example, but not by way of limitation, a detailed description of certain embodiments discussed in the present document.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

In one aspect, the present invention provides a method to design and produce nonlinear ductile behavior of FRP systems such as composites, supports, plates, bars as well as other geometries that may be used as supports. Previous ductile FRP systems have been developed based on hybrid FRP composite systems and showed the ability to provide nonlinear behavior. However, these systems require a combination of multiple types (not mono-type) of fibers which made the hybrids expensive, cumbersome and unattractive for field applications. In addition, failure strain of hybrid fibers was always limited to 3% which does not truly represent ductile behavior.

Figure 1:
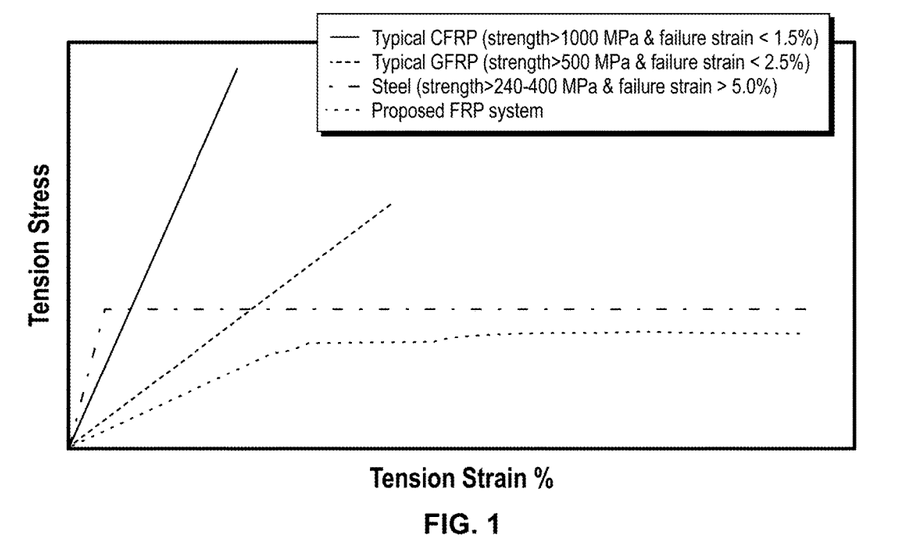
FIG. 1 provides a comparison of the tensile stress-strain curves between steel, CFRP, GFRP, and an embodiment of the present invention deploying the proposed ductile FRP system.

Accordingly, in one embodiment, the present invention provides mono-type ductile FRP systems or composites. FIG. 1 provides a comparison of the tensile stress-strain curves between steel, CFRP, GFRP, and the proposed ductile FRP systems of the present invention in which several preferred embodiments are described below.

In one aspect, the present invention recognizes that the nonlinearity and/or ductility of a FRP that is subjected to tension load, is based on shared stiffness between the different layers with different fiber angle of orientation and fiber lamina thickness. For bidirectional woven fabric composites, as the fiber orientation angle increases, the tensile strength decreases and the strain at failure increases.

Figure 2A:
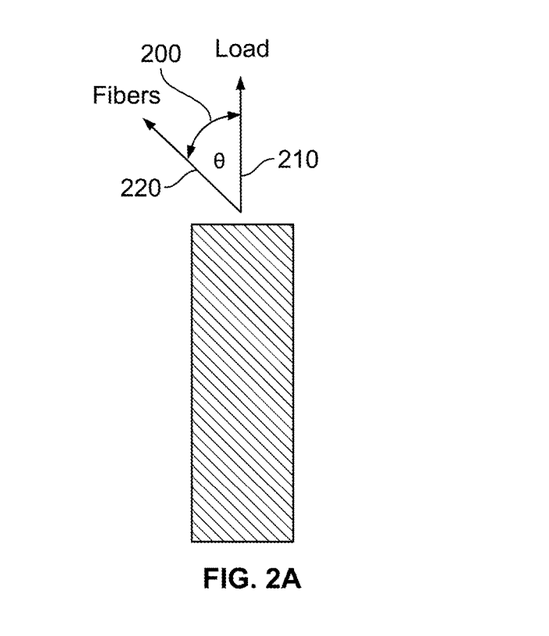
FIG. 2A illustrates fiber orientation with respect to the load.

In one aspect, the embodiments of the present invention vary fiber orientation angle θ (200) with respect to axis 210 and fiber 220 as shown in FIG. 2A. In other embodiments, the axis may be the load.

Figure 2B:
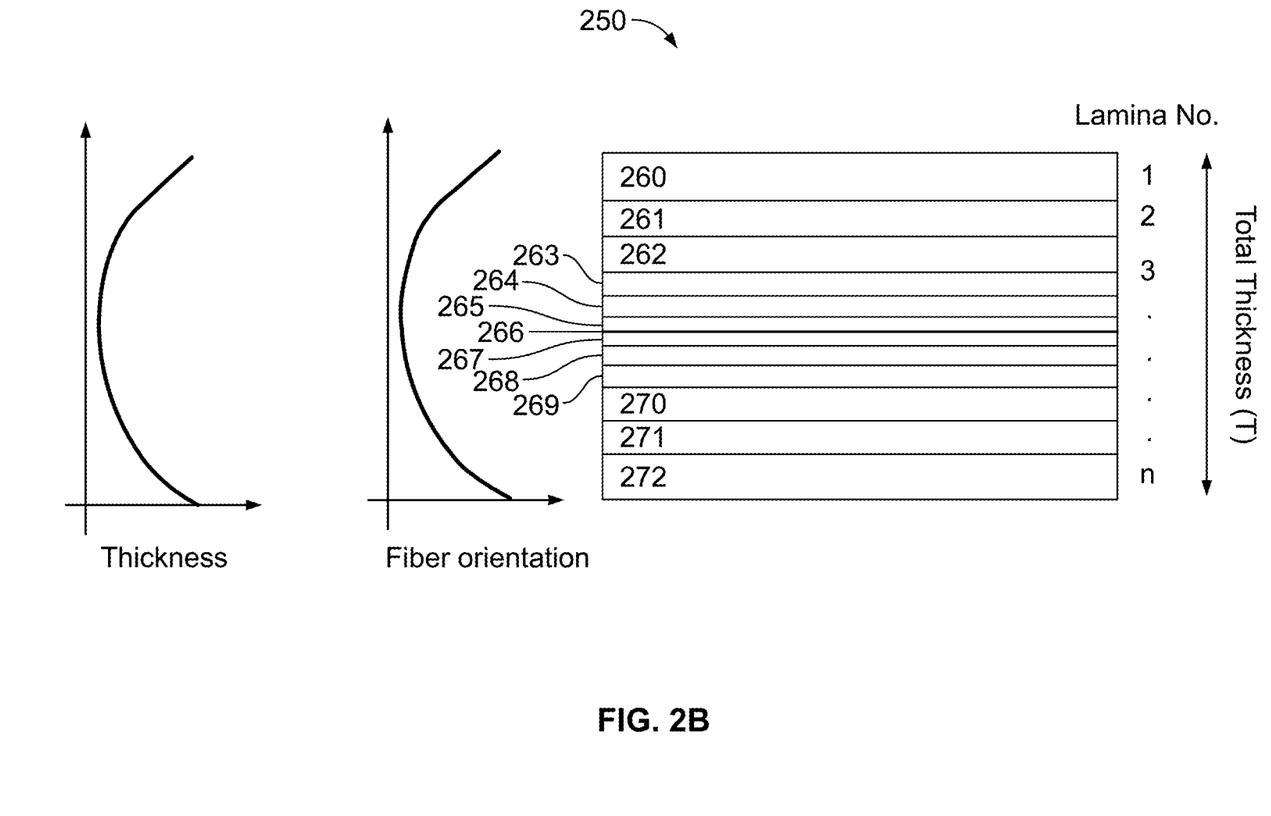
FIG. 2B depicts variation of laminas' fiber orientation and thickness through depth.

As shown in FIG. 2B, for a preferred embodiment of the present invention, FRP composite 250 is comprised of a plurality of layers 260-272, with central portion 266. In other embodiments, n-layers may be used. As shown, layer thickness increases non-linearly from center 266 to outer or edge layers 260 and 272. As is also shown, the angle of fiber orientation with respect to the load or some other predetermined axis, as shown in FIG. 2A, increases non-linearly center 266 to outer or edge layers 260 and 272.

In yet other embodiments, layer thickness and fiber orientation proportionally increase from central portion 266 through the intermediate layers to outer or edge layers 260 and 272. Moreover, in some embodiments, the layers may be symmetrical, in that, the layers form mirror-image pairs around central portion 266 of the composite. For the embodiment shown, the layers form paired layers, which may be identical or similar, such that paired layers 260 and 272 are opposingly located and constructed in the same manner and form outer or edge layers. Intermediate layer pairs 261 and 271, 262 and 270, 263 and 269, 264 and 268 are constructed in the same manner. Inner layer pairs 265 and 267 are also constructed in the same manner. As a result, composite 250 is comprised of two equal halves, which may be mirror images, with a first half comprised of layers 260-265 and a second half comprised of layers 267-272 with a center 266 which may be a separate layer as described above as well.

In another embodiment, the present invention provides a method for optimizing the design of ductile FRP composites.

Figure 3A:
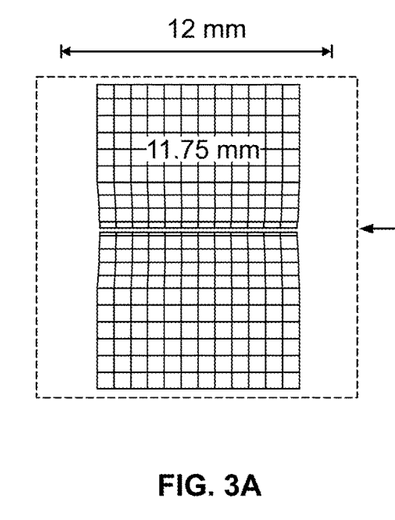
FIGS. 3A-3B illustrate the geometry of a tension test coupon for finite element (FE) simulations in accordance with an embodiment of the present invention.
Figure 3B:
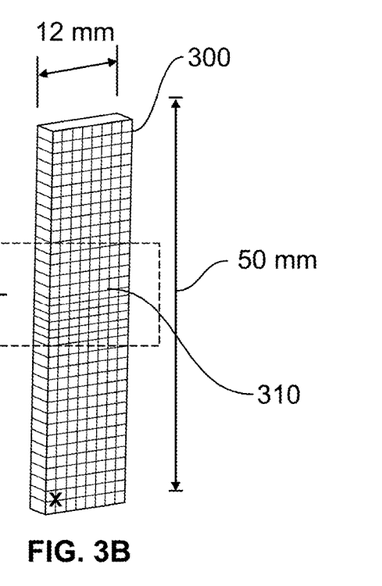

In one particular aspect, a finite element (FE) model for tension tests coupons was constructed using ANSYS® APDL modeling environment (Pennsylvania, Pa., USA). The geometry of test coupon 300 is shown in FIG. 3. The model is supported at the bottom surface in all directions and is subjected to vertical displacement at the top surface. A slight reduction in width was introduced at mid height 310 of coupon 300. This is done to initiate damage at that location and to avoid premature damage at the supported surface. 3D SOLSH190 elements may be used to model the laminated composite materials. SOLSH190 elements are suitable for simulating very thin to moderately thick structures as is the case for composite laminates.

The FE model was divided through thickness to a number of layers which represent various sets of laminas with specific thicknesses and fiber orientations. A Multi-linear Isotropic Hardening material model (MISO) may be used to define the material response for all laminas. The MISO material model is selected in order to account for the gradual damage due to matrix cracking in the form of plasticity.

Figure 4:
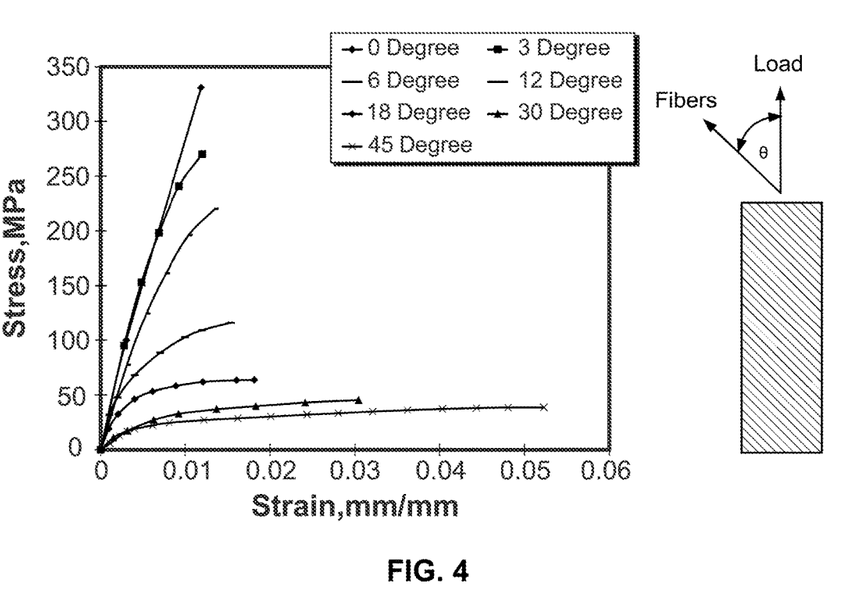
FIG. 4 illustrates experimental stress-strain curves for composite laminas with different fiber orientations for an embodiment of the present invention.
Figure 5A:
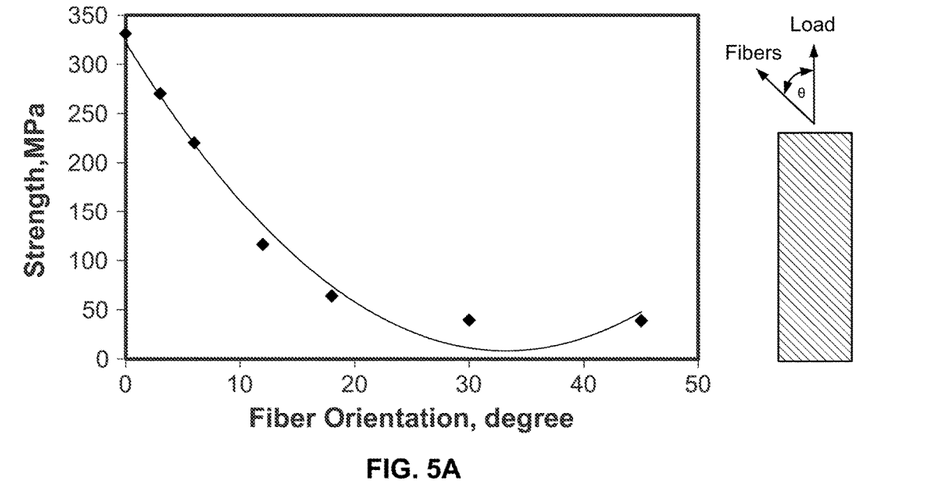
FIG. 5A illustrates curve fitting of experimental tensile strengths as a function of fiber orientation for an embodiment of the present invention.
Figure 5B:
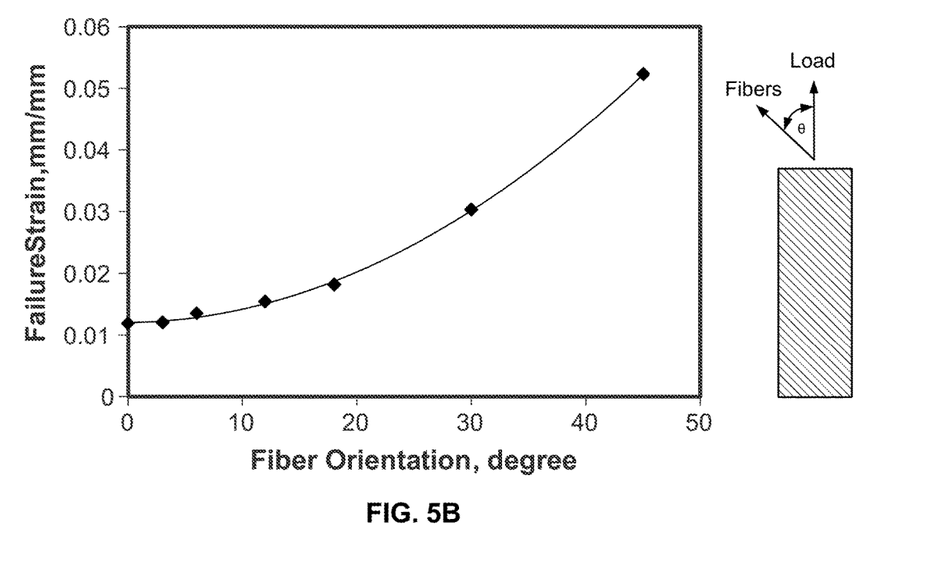
FIG. 5B illustrates curve fitting of failure strains as a function of fiber orientation for an embodiment of the present invention.

The tensile stress-strain response for bidirectional composite laminas with different fiber orientations [0°, 3°, 6°, 12°, 18°, 30°, 45°] was determined as shown in FIG. 4. To interpolate between discrete fiber orientations, the measured stress strain curves were used to establish a correlation between [tensile strength, fiber orientation] and [failure strain, fiber orientation] by curve fitting the experimental tensile strengths and failure strains with second degree curves as shown in FIGS. 5A and 5B.

In order to represent complete failure of composite laminas, a birth and death feature in the ANSYS was utilized. In this approach, the displacement is applied in small increments and all elements are checked against failure strain criterion. Any element that meets the failure criterion will be considered a dead element and its contribution to the FE simulation will be minimized by reducing the stiffness with a factor of $10^{-6}$. The updated status for all elements will feed the following displacement increment.

In yet other embodiments, the methods of the present invention may further use a multi-objective design algorithm to obtain optimal solutions for the design of ductile FRP systems. Design algorithm may be used to determine the optimal stacking sequence of the composite laminates. The optimal stacking sequence includes the determination of optimal number of laminas, number of layers, total thickness, fiber orientation, and sequence of laminas.

In a preferred embodiment, to maximize the tensile strength, stiffness, and failure strain of the FRP systems, the methods of the present invention use a multi-objective design algorithm. A preferred design method that may be used is a three-objective design algorithm that may be written as follows.
Maximize: OBJ={Strength, Stiffness, Failure Strain}
First Parameter (thickness of Layers, t)={$t_1, t_2, t_3, t_4, t_5, t_6$}
Second Parameter (Fiber Orientation, θ)={$\theta_1, \theta_2, \theta_3, \theta_4, \theta_5, \theta_6$}

Figure 6A:
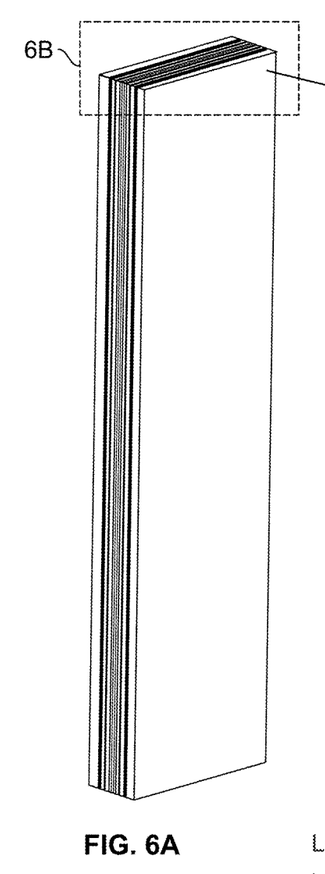
FIGS. 6A-6B illustrate a cross-section of a ductile FRP plate for an embodiment of the present invention.
Figure 6B:
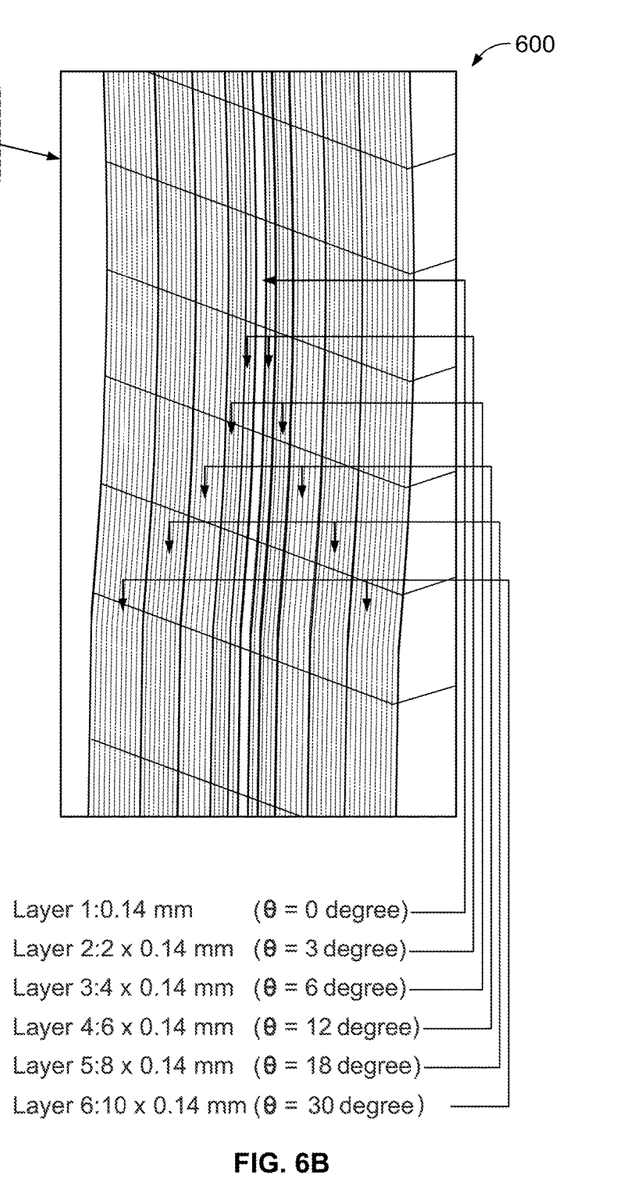
Figures 7A, 7B:
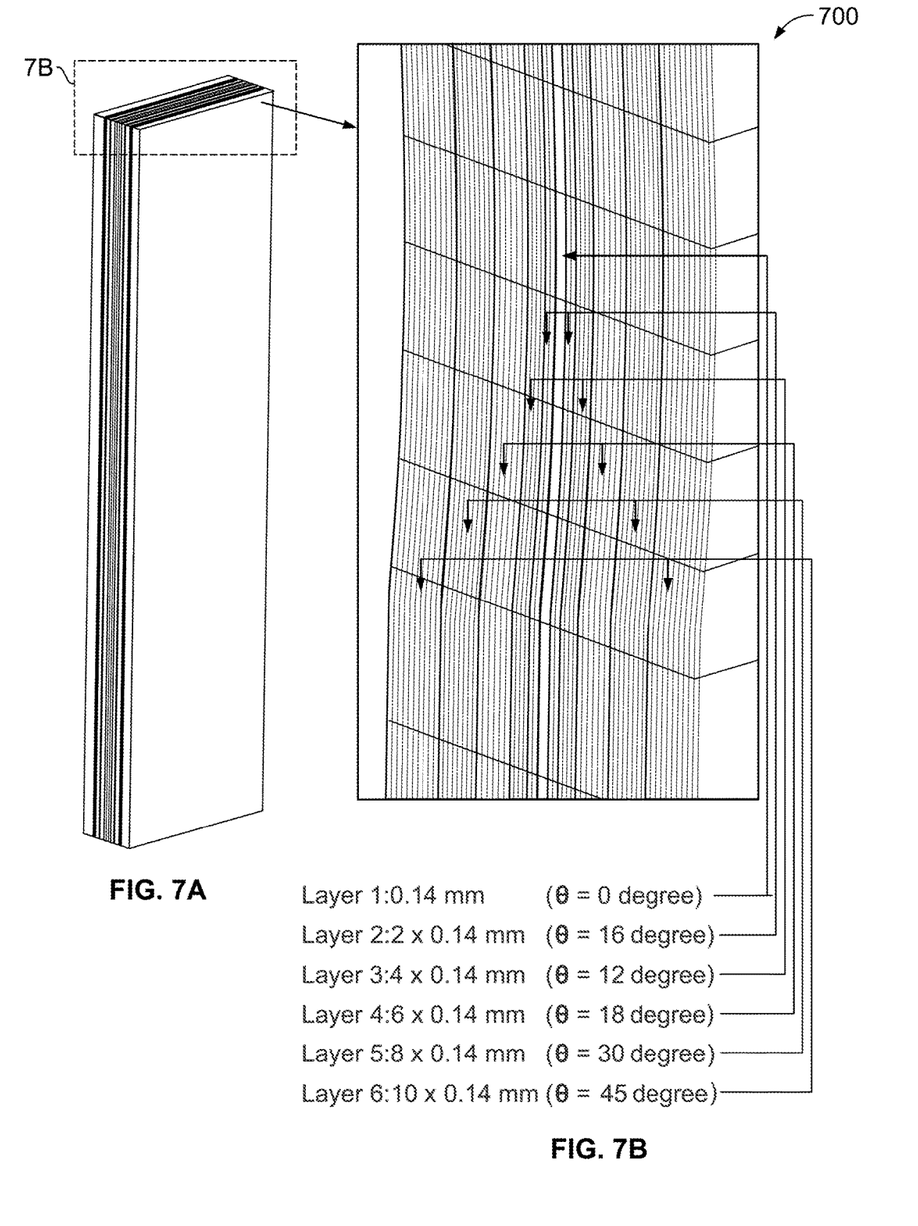
FIGS. 7A-7B illustrate a cross-section of a ductile FRP plate for another embodiment of the present invention.
Figures 8A, 8B:
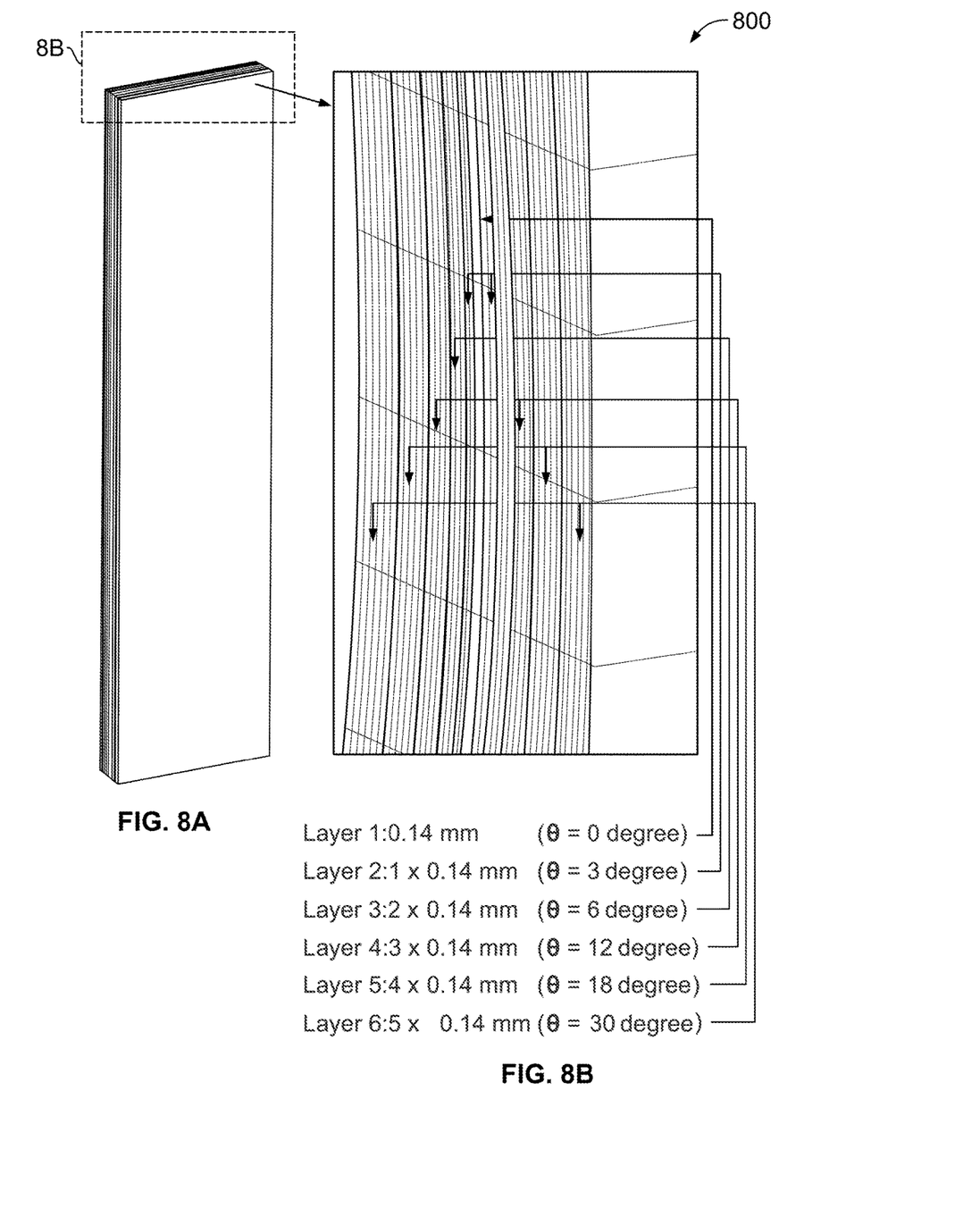
FIGS. 8A-8B illustrate a cross-section of a ductile FRP plate for another embodiment of the present invention.
Figure 9A:
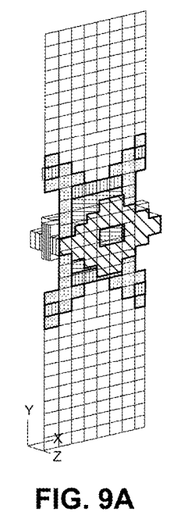
FIG. 9A shows the failed elements of the embodiment shown in FIGS. 6A-6B.
Figure 9B:
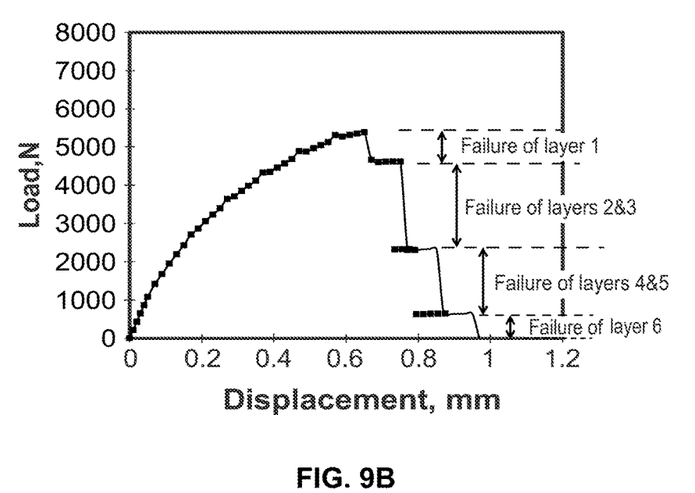
FIG. 9B shows the load-displacement response of the embodiment shown in FIGS. 6A-6B.
Figure 10A:
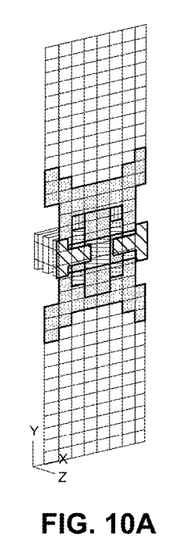
FIG. 10A shows the failed elements of the embodiment shown in FIGS. 7A-7B.
Figure 10B:
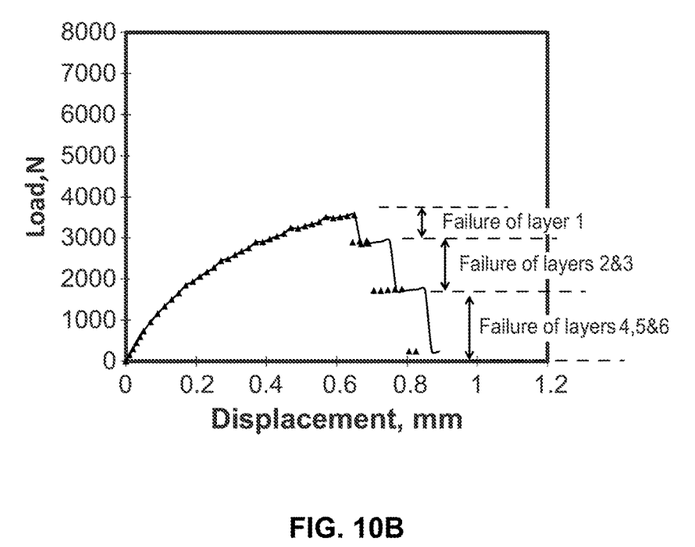
FIG. 10B shows the load-displacement response of embodiment shown in FIGS. 7A-7B.
Figure 11A:
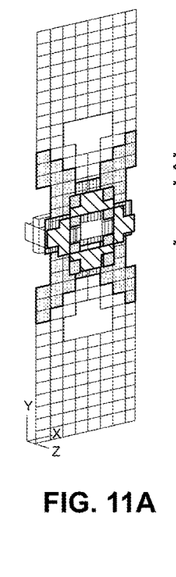
FIG. 11A shows the failed elements of the embodiment shown in FIGS. 8A-8B.
Figure 11B:
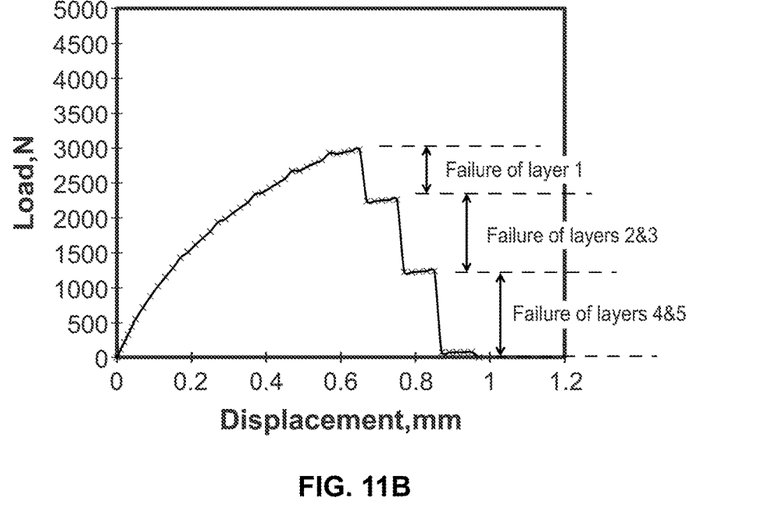
FIG. 11B shows the load-displacement response of the embodiment shown in FIGS. 8A-8B.

The above discussed methods were used to design the FRP composites shown in FIGS. 6-8. For all designs, the stacking sequence of laminas, including fiber orientation angles and number of laminas for each layer, are provided for illustrative purposes but other sequences may be used as well.

The layer thickness ratio, which represents the ratio between the thicknesses of θ fiber orientation layer to the thickness of 0° fiber orientation layer, is also considered for each design. A layer may be a set of laminas with the same fiber orientation.

As shown in FIGS. 6A-6B, in one embodiment, the present invention provides a FRP composite such as a bar, rod, support or plate 600 that consists of thirty-one symmetric laminas or plies that correspond to six layers.

With respect to a predetermined axis, such as the load, fiber orientations θ of 0°, 3°, 6°, 12°, 18°, and 30° and layer thickness ratios of 1, 2, 4, 6, 8, and 10 were provided for this embodiment. The total thickness of the composite laminate is 4.34 mm and the thickness of a single lamina or ply is 0.14 mm. The ply may also be some other substantially uniform thickness. A cross section of FRP plate 600 is shown in FIGS. 6A-6B. This arrangement was computationally simulated to examine the concepts of the invention.

The stacking sequence for the composite laminas is as follows:

| Layer | Number of Laminas/ Thickness | Fiber Orientation |
| --- | --- | --- |
| 1 | 0.14 mm | ±0° |
| 2 | 2 × 0.14 mm | ±3° |
| 3 | 4 × 0.14 mm | ±6° |
| 4 | 6 × 0.14 mm | ±12° |
| 5 | 8 × 0.14 mm | ±18° |
| 6 | 10 × 0.14 mm | ±30° |

As further shown in FIGS. 6A-6B, layers 2-6 may be comprised of pairs that are similarly constructed.

As shown in FIGS. 7A-7B, the design of plate 700 is similar to the design of plate 600 in terms of plate and layer thickness ratio while they differ in terms of the fiber orientation angles. With respect to a predetermined axis, such as the load, fiber orientations θ of 0°, 6°, 12°, 18°, 30°, and 45° and layer thickness ratios of 1, 2, 4, 6, 8, and 10 were selected. The total thickness of the composite laminate is 4.34 mm and the thickness of a single lamina or ply is 0.14 mm. The ply may also be some other substantially uniform thickness. A cross section of the FRP plate is shown in FIGS. 7A-7B. This arrangement was computationally simulated to further examine the concepts of the invention.

The stacking sequence for the composite laminas is as follows:

| Layer | Number of Laminas/ Thickness | Fiber Orientation |
| --- | --- | --- |
| 1 | 0.14 mm | ±0° |
| 2 | 2 × 0.14 mm | ±6° |
| 3 | 4 × 0.14 mm | ±12° |
| 4 | 6 × 0.14 mm | ±18° |
| 5 | 8 × 0.14 mm | ±30° |
| 6 | 10 × 0.14 mm | ±45° |

As further shown in FIGS. 7A-7B, layers 2-6 may be comprised of pairs that are similarly constructed.

As shown in FIGS. 8A-8B, the design of plate 800 utilizes sixteen laminas or plies and therefore the total thickness of the FRP composite was reduced to 2.24 mm. To reduce the number of laminas, the symmetry of the stacking sequence was not considered in this design. With respect to a predetermined axis, such as the load, fiber orientations θ of 0°, 3°, 6°, 12°, 18°, and 30° and layer thickness ratios of 1, 2, 3, 4, and 5 were selected. A cross section of FRP plate 800 is shown in FIGS. 8A-8B. This arrangement was computationally simulated and then fabricated to experimentally demonstrate the concepts of the invention.

The stacking sequence for the composite laminas is as follows:

| Layer | Number of Laminas/ Thickness | Fiber Orientation |
|---|---|---|
| 1 | 0.14 mm | ±0° |
| 2 | 1 × 0.14 mm | ±3° |
| 3 | 2 × 0.14 mm | ±6° |
| 4 | 3 × 0.14 mm | ±12° |
| 5 | 4 × 0.14 mm | ±18° |
| 6 | 5 × 0.14 mm | ±30° |

As further shown in FIGS. 8A-8B, layers 2-6 may be comprised of pairs that are similarly constructed.

The load-displacement responses for the designs described above and snapshots for the failed elements are shown in FIGS. 9A-B, 10A-B, and 11A-B. In addition, the load-displacement responses for the designs are compared in FIG. 12.

Figure 12:
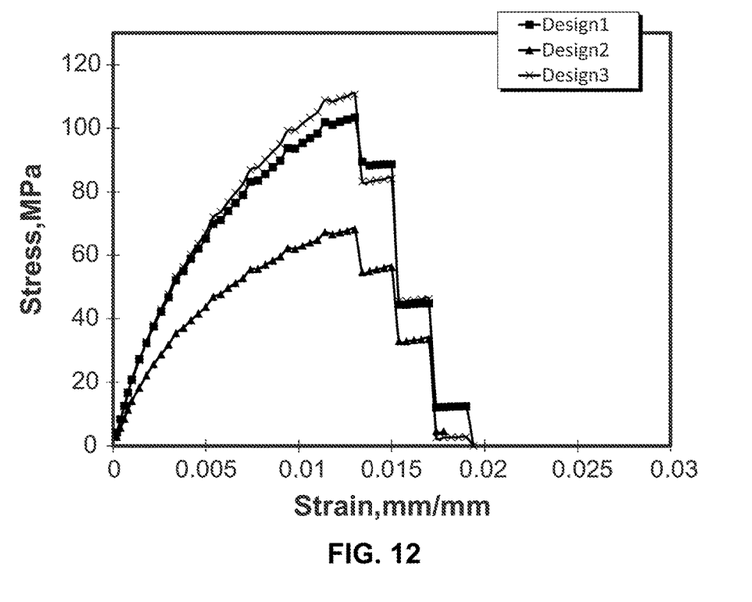
FIG. 12 provides a comparison between the FRP designs of the embodiments shown in FIGS. 6A-6B, FIGS. 7A-7B AND FIGS. 8A-8B.

As shown, FRP plate 600 obtained tensile strength, stiffness, and failure strain of 105 MPa, 20 GPa, and 2.0% respectively. These properties reduced to 69 MPa, 14 GPa, and 1.8% respectively in plate 700. A tensile strength of 111 MPa was observed in plate 800.

It can be deduced that using a thick ±45° layer may reduce the strength and stiffness of plates 600 and 800. Moreover, with the same fiber orientations, changing the layer thickness ratio in plate 800 slightly increased the tensile strength with respect to plate 600. In general, the comparison between the designs shows that plates 600 and 800 are fairly close in terms of the load-displacement response and they outperform plate 700.

In addition, tension test experiments will be conducted to verify the optimal design for ductile FRP composites.

In other embodiments of the present invention, nanomaterials may be utilized to further improve the strength and the ductility of the ductile FRP composites.

In yet other embodiments, the present invention may be used to optimize FRP composites such as ductile FRP plates with relatively high strength (≥170 MPa) and strain at failure (>5.0%) while keeping the stiffness above 70 GPa, such that the composites may be used for many infrastructure and aerospace applications.

The composites of the present invention may be constructed from mono-fibers such as glass, carbon, aramid, Kevlar, synthetic or any other fiber type.

Matrices that may be used include, but are not limited to, epoxy, polyester, vinyl ester or any other polymer or nanocomposite.

In yet other embodiments, the composites of the present invention include, but are not limited to, ductile CFRP plates, ductile CFRP circular bars, and ductile GFRP circular bars.

Figure 13A:
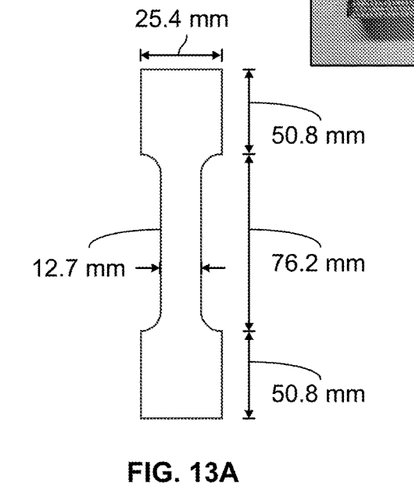
FIG. 13A shows the dimensions of a dumbbell-shaped coupon.
Figure 13B:
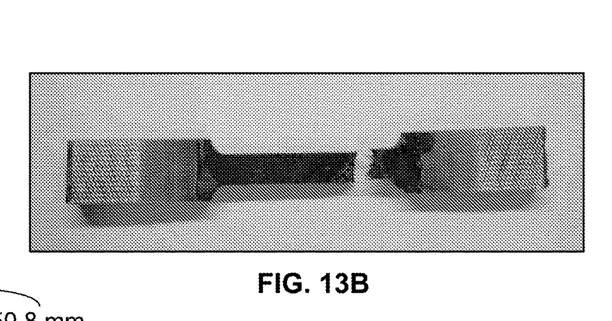
FIG. 13B shows a failed specimen.
Figure 13C:
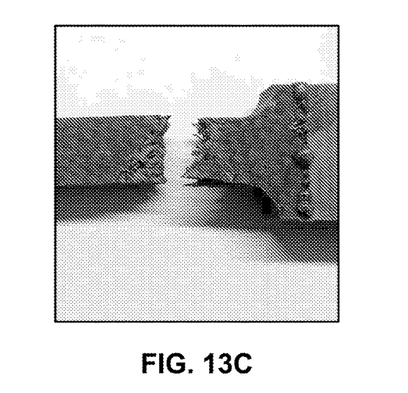
FIG. 13C shows a close view of the failure region.
Figure 14:
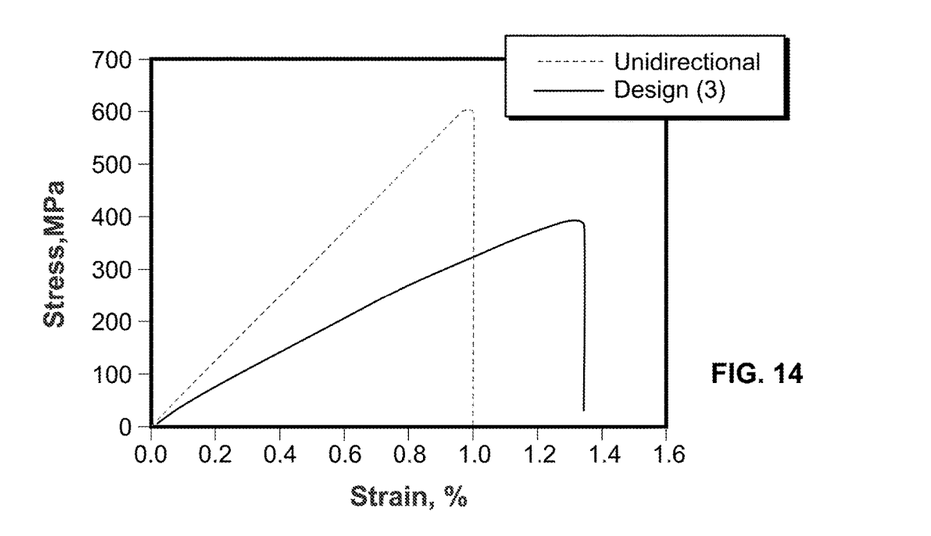
FIG. 14 provides a comparison between the experimental stress strain curves for the embodiment shown in FIGS. 8A-8B and unidirectional coupons.

Testing was conducted on the embodiment of FIGS. 8A-8B. Four specimens were tested according to ASTM D3039 standards. The composite coupons were fabricated using vacuum assisted hand layup technique. Because the sixteen-lamina coupons were relatively thick, they were machined in a dumbbell (dogbone) shape to avoid any failure in the gripping due to inadequate shear transfer at the two ends of the coupons. The dimensions and failure of the dumbbell coupons are shown in FIG. 13. Tensile failure was observed in all specimens and no shear failure was observed in the gripping regions. FIG. 14 shows a comparison of the mean stress-strain curves between the design and a unidirectional coupon with the same overall dimensions, number of laminas, and total thickness. The comparison is established with the unidirectional coupons as a reference specimen in order to investigate any changes in the mechanical properties associated with the arrangements of the design of FIGS. 8A-8B. From the figure, it is observed that the mean tensile strength, tensile modulus, and failure strain for the embodiment were 380 MPa, 33 GPa, and 1.35% respectively while the same mechanical properties were 590 MPa, 62 GPa, and 1.0% for the unidirectional coupons. Although the tensile strength and tensile modulus reduced by 36% and 46% respectively, the results show that an increase in the failure strain of 35% is achieved by varying the layer thickness and fiber orientation through depth as in the case of the design of FIGS. 8A-8B. The reduction in tensile strength and tensile modulus is acceptable for civil infrastructural applications since the FRP composite reinforcements are high strength high modulus materials. However, an increase of 35% in failure strain does not add considerable ductility to the FRP composite.

In order to obtain ductile FRP, higher increase in failure strain is required while maintaining adequate tensile strength and tensile modulus of the composite system. To do so, additional analysis was performed in the design of FIGS. 8A-8B based on the axial stiffness ratios of different layers.

Figure 15:
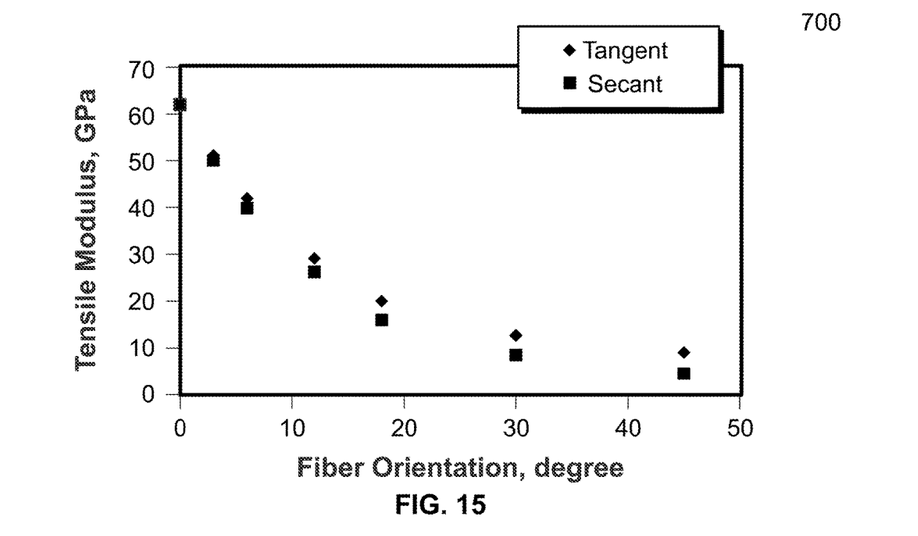
FIG. 15 provides tangent and secant moduli for different fiber orientation angles.

The goal of performing the axial stiffness analysis is to maintain appropriate load sharing ratios among all layers at different load levels. Appropriate load sharing ratios will guarantee gradual load transfer between different layers during the progressive failure of the ductile FRP plate. The load sharing ratios between different layers are obtained by calculating the corresponding axial stiffness (EA/L) ratios. For the axial stiffness calculations, since the length L is constant for all layers, only the quantity EA was used to obtain the axial stiffness ratios. To maintain appropriate axial stiffness ratios at different load levels, the analysis is performed at two stages, initial and peak load. The tangent (initial) modulus is used to calculate the axial stiffness (EA) in the initial stage, while the secant modulus is used to calculate the axial stiffness at peak load stage. The secant modulus is computed by reducing the tangent modulus with a fraction based on the fiber orientation angle. As the fiber orientation angle increases, the reduction for the secant modulus also increases following FIG. 15. For example, while 0% reduction is considered to calculate the secant modulus of 0° layer, a 50% reduction is considered to calculate the secant modulus of 45° layer. In fact, the drop in modulus from the tangent to secant represents the intensity of matrix damage within the respective layer. It is well established that off-axis layers observe significant matrix damage when they are subjected to tensile stresses.

Table (1) shows the load sharing ratios between different layers in the design of FIGS. 8A-8B. For each layer with specific fiber orientation, initial and peak-load EAs are calculated. The EAs values are then used to calculate initial and peak load sharing ratios between all layers. The coefficients of variation COV (%) for the sharing ratios are then determined to evaluate the load transfer between different layers in the design of FIGS. 8A-8B. For the design of FIGS. 8A-8B, COVs of 20.32% and 23.66% were obtained for the initial and peak sharing loads respectively. It is important to note that by reducing the COV %, better load transfer between different layers can be achieved. Therefore, one of the objectives of the present invention is to minimize the COVs % of the initial and peak load to avoid sudden failure of the ductile FRP plates. To account for the load sharing ratios between layers, a new design is proposed below.

TABLE 1

Load sharing ratios and axial stiffness calculations for the design of FIGS. 8A-8B

| Fiber Orientation,° | 0 | 3 | 6 | 12 | 18 | 30 | Total/Sum | Mean | COV % |
|---|---|---|---|---|---|---|---|---|---|
| Area, 1 layer | 1.736 | 1.736 | 1.736 | 1.736 | 1.736 | 1.736 | | | |
| Number of layers | 1 | 1 | 2 | 3 | 4 | 5 | 16 | | |
| Total Area, mm² | 1.736 | 1.736 | 3.472 | 5.208 | 6.944 | 8.68 | | | |
| E (Tangent Modulus), GPa | 62.0 | 51.1 | 41.9 | 29.2 | 20.1 | 12.8 | | | |
| Initial EA, kN | 107.6 | 88.6 | 145.6 | 152.0 | 139.3 | 110.8 | 743.9 | | |
| Initial load sharing ratios | 14.47% | 11.91% | 19.57% | 20.43% | 18.72% | 14.89% | | 16.67% | 20.32% |
| Reduction at peak load, % | 0.00% | 2.00% | 5.00% | 10.00% | 20.00% | 33.00% | | | |
| E(Secant Modulus), GPa | 62.0 | 50.0 | 39.8 | 26.3 | 16.0 | 8.6 | | | |
| EA at peak, kN | 107.6 | 86.9 | 138.3 | 136.8 | 111.4 | 74.2 | 655.3 | | |
| Load sharing ratios at peak | 16.43% | 13.26% | 21.11% | 20.87% | 17.01% | 11.33% | | 16.67% | 23.66% |

In yet another embodiment, the present invention provides a final optimal design for the ductile FRP plates based on the observation of the experimental testing and computational simulations of the design of FIGS. 8A-8B and the calculations of load sharing ratios between different layers.

Figure 16A:
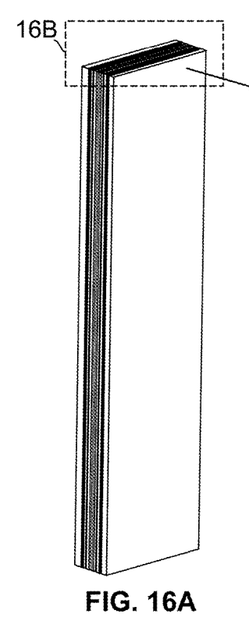
FIGS. 16A-16B illustrate a cross-section of a ductile FRP plate for another embodiment of the present invention.
Figure 16B:
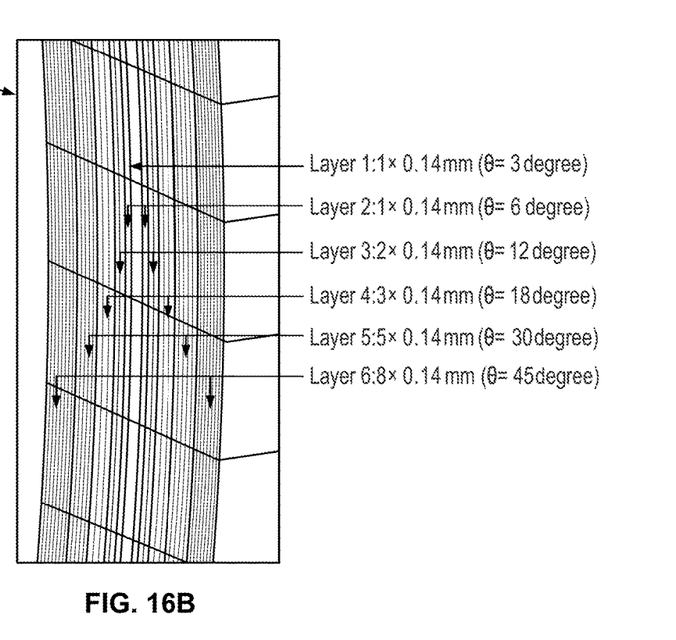

A cross section and stacking sequence for this embodiment of a preferred embodiment is shown in FIGS. 16A-16B. In this design, the fraction of low fiber orientation angle layers (0°, 3°, 6°) is reduced and a thick 45° layer was introduced.

The design increases the ductility and strain at failure significantly while reducing the tensile strength and tensile modulus as compared to the design of FIGS. 8A-8B. A reduction in tensile strength and tensile modulus is acceptable given the relatively high strength and high tensile modulus of the design of FIGS. 8A-8B. In addition, the load sharing ratio calculations for the embodiment is presented in Table (2). The table shows significant drop in COV % of the load sharing ratios at peak from 23.66% to 13.93% with the new stacking sequence. The low COV % will guarantee adequate load transfer and sharing ratios between all layers.

the invention, the thickness of layers of the composite do not need to increase from the inner layer to the edge layer. In yet a further preferred embodiment, the composite is comprised of mono-fibers and the load sharing ratios of the layers have coefficients of variation that are less than 20%.

Figure 17A:
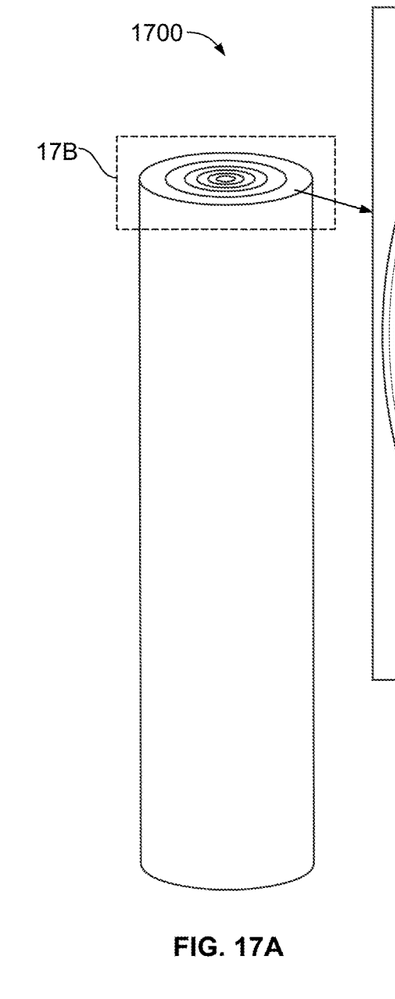
FIGS. 17A-17B illustrate a cross-section of a ductile FRP plate for another embodiment of the present invention.
Figure 17B:
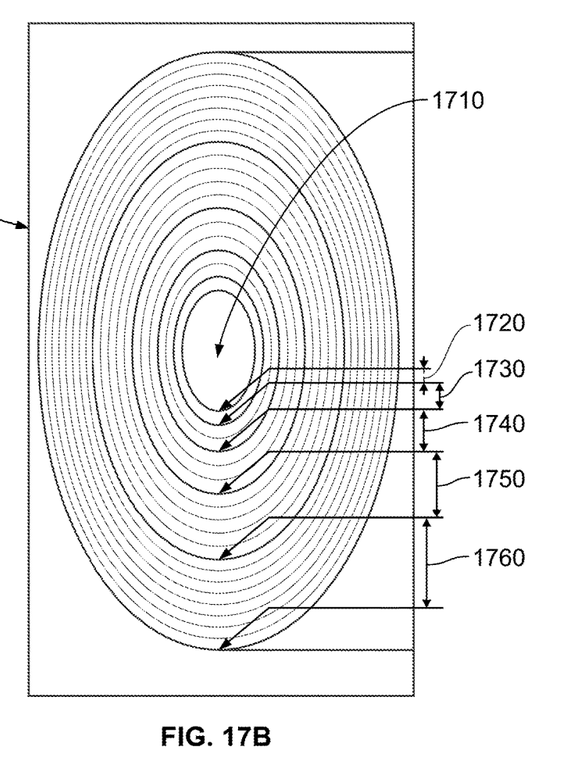

As further shown in FIGS. 17A-17B, another embodiment of the present invention is comprised of a rod 1710 having layers 1720, 1730, 1740, 1750 and 1760. The layers may be comprised of plies. The layers may be configured to maintain predetermined load sharing ratios among the layers at different load levels to produce a gradual load transfer between the different layers during the progressive failure of the composite. Thus, in other aspects, the thickness of the layers of the composite do not need to increase non-linearly from the inner layer to edge layer as shown. In yet a further preferred embodiment, the composite is comprised of mono-fibers and the load sharing ratios of the layers have coefficients of variation that are less than 20%.

While the foregoing written description enables one of ordinary skill to make and use what is considered presently

TABLE 2

Load sharing ratios and axial stiffness calculations for the design of FIGS. 16A-16B.

| Fiber Orientation,° | 3 | 6 | 12 | 18 | 30 | 45 | Total/Sum | Mean | COV % |
|---|---|---|---|---|---|---|---|---|---|
| Area, 1 layer | 1.736 | 1.736 | 1.736 | 1.736 | 1.736 | 1.736 | | | |
| Number of layers | 1 | 1 | 2 | 3 | 5 | 8 | 20 | | |
| Total Area, mm² | 1.736 | 1.736 | 3.472 | 5.208 | 8.68 | 13.888 | | | |
| E (Tangent Modulus), GPa | 51.1 | 41.9 | 29.2 | 20.1 | 12.8 | 9.1 | | | |
| Initial EA, kN | 88.6 | 72.8 | 101.3 | 104.5 | 110.8 | 126.6 | 604.6 | | |
| Initial load sharing ratios | 14.66% | 12.04% | 16.75% | 17.28% | 18.32% | 20.94% | | 16.67% | 18.36% |
| Reduction at peak load, % | 2.00% | 5.00% | 10.00% | 20.00% | 33.00% | 50.00% | | | |
| E(Secant Modulus), GPa | 50.0 | 39.8 | 26.3 | 16.0 | 8.6 | 4.6 | | | |
| EA at peak, kN | 86.9 | 69.2 | 91.2 | 83.6 | 74.2 | 63.3 | 468.3 | | |
| Load sharing ratios at peak | 18.55% | 14.77% | 19.47% | 17.85% | 15.85% | 13.52% | | 16.67% | 13.93% |

In yet another embodiment, the present invention provides a fiber reinforced polymer composite having a plurality of layers containing a plurality of fibers. The layers may be configured to maintain predetermined load sharing ratios among the layers at different load levels to produce a gradual load transfer between the different layers during the progressive failure of the composite. Thus, in other aspects of to be the best mode thereof, those of ordinary skill will understand and appreciate the existence of variations, combinations, and equivalents of the specific embodiment, method, and examples herein. The disclosure should therefore not be limited by the above described embodiments, methods, and examples, but by all embodiments and methods within the scope and spirit of the disclosure.

What is claimed is:

1. A fiber reinforced polymer composite comprising:
a plurality of layers containing a plurality of mono-fibers;
said plurality of layers comprising at least one inner layer, intermediate layer and an edge layer;
each of said layers having a thickness, said thickness of each said layer varies from said inner layer to said edge layer;
said fibers in each of said layers having a fiber orientation angle throughout said layer with respect to a predetermined axis;
said fiber orientation angle of each said layer varies from said inner layer to said edge layer; and
said layers having load sharing ratios that have coefficients of variation, said coefficients of variation are less than 20%.

2. The composite of claim 1 wherein said thickness of each said layer varies non-linearly.

3. The composite of claim 1 wherein said fiber orientation angle of each said layer varies non-linearly.

4. The composite of claim 1 wherein said fiber orientation angle of each said layer varies non-linearly and said thickness of each said layer varies non-linearly.

5. The composite of claim 4 wherein said composite has nonlinear ductile behavior.

6. The composite of claim 1 wherein at least one of said layers is comprised of a plurality of plies and said plies are symmetric.

7. The composite of claim 6 wherein said plies have a substantially uniform thickness.

8. The composite of claim 1 wherein said thickness of each said layer increases non-linearly from said inner layer to said edge layer.

9. The composite of claim 1 wherein said fiber orientation angle of each said layer increases non-linearly from said inner layer to said edge layer.

10. The composite of claim 1 wherein said thickness of each said layer increases non-linearly from said inner layer to said edge layer, said fiber orientation angle of each said layer increases non-linearly from said inner layer to said edge layer, and said composite has nonlinear ductile behavior.

11. The composite of claim 1 wherein the thickness of each of said layers varies from said inner layer, through said intermediate layer to said edge layer.

12. The composite of claim 1 further comprising mirror image pairs of said inner, said intermediate and said edge layers.

13. A fiber reinforced polymer composite comprising:
a plurality of layers containing a plurality of fibers;
said layers configured to maintain predetermined load sharing ratios among said layers at different load levels to produce a gradual load transfer between said different layers during the progressive failure of said composite; and
said layers having coefficients of variation, said coefficients of variation are less than 20%.

14. The composite of claim 13 wherein the thickness of each said layer varies non-linearly.

* * * * *